(12) United States Patent
Howard

(10) Patent No.: US 7,058,355 B2
(45) Date of Patent: Jun. 6, 2006

(54) PROPAGATION OF A WIRELESS NETWORK THROUGH COMMERCIAL OUTLETS

(76) Inventor: Newton Howard, 1600 N. Oak St., Suite 718, Arlington, VA (US) 22209

( * ) Notice: Subject to any disclaimer, the term of this patent is extended or adjusted under 35 U.S.C. 154(b) by 309 days.

(21) Appl. No.: 10/226,328

(22) Filed: Aug. 23, 2002

(65) Prior Publication Data

US 2004/0203335 A1    Oct. 14, 2004

(51) Int. Cl.
*H04Q 7/24*    (2006.01)
*G06F 15/16*    (2006.01)

(52) U.S. Cl. ............. 455/3.01; 455/446; 455/422.1; 370/338; 370/254

(58) Field of Classification Search ............. 455/3.01, 455/446, 422.1, 338, 254; 370/338, 254
See application file for complete search history.

(56) References Cited

U.S. PATENT DOCUMENTS

| | | |
|---|---|---|
| 5,450,405 A | 9/1995 | Maher et al. |
| 5,661,723 A | 8/1997 | Ueno et al. |
| 5,748,619 A | 5/1998 | Meier |
| 6,028,857 A | 2/2000 | Poor |
| 6,038,595 A | 3/2000 | Ortony |
| 6,044,062 A | 3/2000 | Brownrigg et al. |
| 6,044,075 A | 3/2000 | Le Boudec et al. |
| 6,104,712 A | 8/2000 | Robert et al. |
| 6,415,312 B1 | 7/2002 | Boivie |
| 6,452,910 B1 | 9/2002 | Vij et al. |
| 6,512,754 B1 | 1/2003 | Feder et al. |
| 6,526,034 B1 | 2/2003 | Gorsuch |
| 6,560,329 B1 * | 5/2003 | Draginich et al. ...... 379/265.02 |
| 6,633,757 B1 | 10/2003 | Hermann et al. |
| 6,744,878 B1 * | 6/2004 | Komissarchik et al. 379/265.03 |
| 2003/0110342 A1 * | 6/2003 | Chiang et al. ............... 710/316 |
| 2004/0062224 A1 * | 4/2004 | Brownrigg et al. .......... 370/338 |
| 2005/0117526 A1 * | 6/2005 | Melnik ....................... 370/254 |

OTHER PUBLICATIONS

U.S. Appl. No. 09/912,918.
U.S. Appl. No. 09/924,885.

* cited by examiner

*Primary Examiner*—Nay Maung
*Assistant Examiner*—Alan T. Gantt
(74) *Attorney, Agent, or Firm*—Bingham McCutchen LLP

(57) ABSTRACT

The present invention provides a cost effective way to expand wireless networks by WSPs that also provides other benefits besides increased bandwidth.

6 Claims, 1 Drawing Sheet

PROPAGATION OF A WIRELESS NETWORK THROUGH COMMERCIAL OUTLETS

CROSS-REFERENCE TO RELATED APPLICATIONS

The following references, to the extent that they provide exemplary procedural or other information or details supplementary to those set forth herein, are specifically incorporated herein by reference: U.S. patent application Ser. No. 09/912,918 filed on Jul. 25, 2001, and Ser. No. 09/924,885 filed on Aug. 8, 2001.

BACKGROUND OF THE INVENTION

1. Field of Invention

The invention generally relates to the deployment of a wireless network in conjunction with commercial outlets.

2. Description of Related Art

Network computing has revolutionized everyday life. With the widespread popularity of the Internet, it has changed how people around the world obtain information, shop and communicate with one another. However, the rise in the usage of the Internet was accompanied by the need to upgrade and increase the existing communications capabilities of today's society. Whole neighborhoods and in some cases whole cities have been "re-wired" to meet the increased demands for communication capacity. However, the cost of "re-wiring" comes at a very high price. Laying down fiber optic cable and purchasing routing equipment is very expensive.

Additionally, with the evolution of wireless communications devices, a new "version" of the Internet has appeared, a wireless version. People are no longer required to be physically linked to a telephone jack or a communications outlet of some kind. People can now "surf" the Internet using wireless devices such as mobile telephones and laptops. However, in the present form of use, numerous towers and transceivers are needed to provide enough transmission capability and coverage for users to have even basic text message capabilities, much less graphical capabilities. In all such cases, the solution to increasing communications capacity lies with the purchase and installation of expensive transceivers. This is a fixed cost with no benefit to the wireless service providers (WSPs) besides the future increased bandwidth. These costs can only be recouped from revenue generated from service plans and this ultimately increases the rates charged to end-users.

Therefore, there is a need for a way to expand wireless networks by WSPs that is cost effective and that provides other benefits besides increased bandwidth. The present invention addresses this need.

BRIEF SUMMARY OF THE INVENTION

A wireless service provider comprising of a series of commercial outlets in a geographical area, some examples that are illustrative, but not exclusive, include a county, town, city, territory, state, a region of territories, a group of states, a country, a series of countries, a continent, a series of continents or the like, which sell products to a targeted consumer group, some examples that are illustrative, but not exclusive, include consumers of coffee and healthful drinks. Within these commercial outlets are workstations in which customers can use to browse the Internet and conduct other online activities. As the customers are enjoying their purchased products they can use the workstations either for free or at some fixed rate.

The featured products serve several roles in the present invention. First, it serves as a way to entice users to enter the store. For example as mentioned earlier, coffee and healthful drinks, act to draw customers to the commercial outlet. Once, the customer is in the commercial outlet, the customer can be enticed to use the Internet service provided by its presence and ease of accessibility. Secondly, the cost of installation of wireless transceivers can be offset by the sale of goods in the commercial outlet. In the example given, the cost of installing the transceivers is also incorporated into the cost of running the commercial outlet because the Internet service is a feature of the commercial outlet. Any unused bandwidth can then be used for other purposes or sold to others. This further provides another source of revenue to offset the cost of installation of the transceiver equipment. Subsequently, with the additional of every new commercial outlet the coverage and the bandwidth for the WSP also increases. In essence, the commercial outlets serve as the "backbone" for the WSP.

Another exemplary embodiment of the present invention could be in the form of commercial outlets involving food services, some examples that are illustrative, but not exclusive, include fast food restaurants, traditionally sit-down restaurants with or without waiters and other eating establishments.

Another exemplary embodiment of the present invention could include retail stores, some examples that are illustrative, but not exclusive, include clothing, music, electronics, books, communication, furniture, groceries, tools and equipment and other retail stores.

Another exemplary embodiment of the present invention could include entertainment, some examples that are illustrative, but not exclusive, include music, either live, recorded or broadcasted, plays, movies, sports, comedic shows, magic, amusement parks and other forms of recreation and entertainment.

Another exemplary embodiment of the present invention could include lodging, some examples that are illustrative, but not exclusive, include hotels, motels, inns, taverns and other forms of lodging.

Another exemplary embodiment of the present invention could include banking establishments. An illustrative, but not exclusive example could include using individual ATM machines scattered across the geographical area to send transactions using wireless technology.

Of course any of the embodiments mentioned could be used in conjunction with each other or in conjunction with another unmentioned embodiment to form another viable embodiment.

BRIEF DESCRIPTION OF THE DRAWING

The preferred embodiments of this invention will be described in detail, with reference to the following FIGURE, wherein.

DETAILED DESCRIPTION OF THE INVENTION

Figure 1:
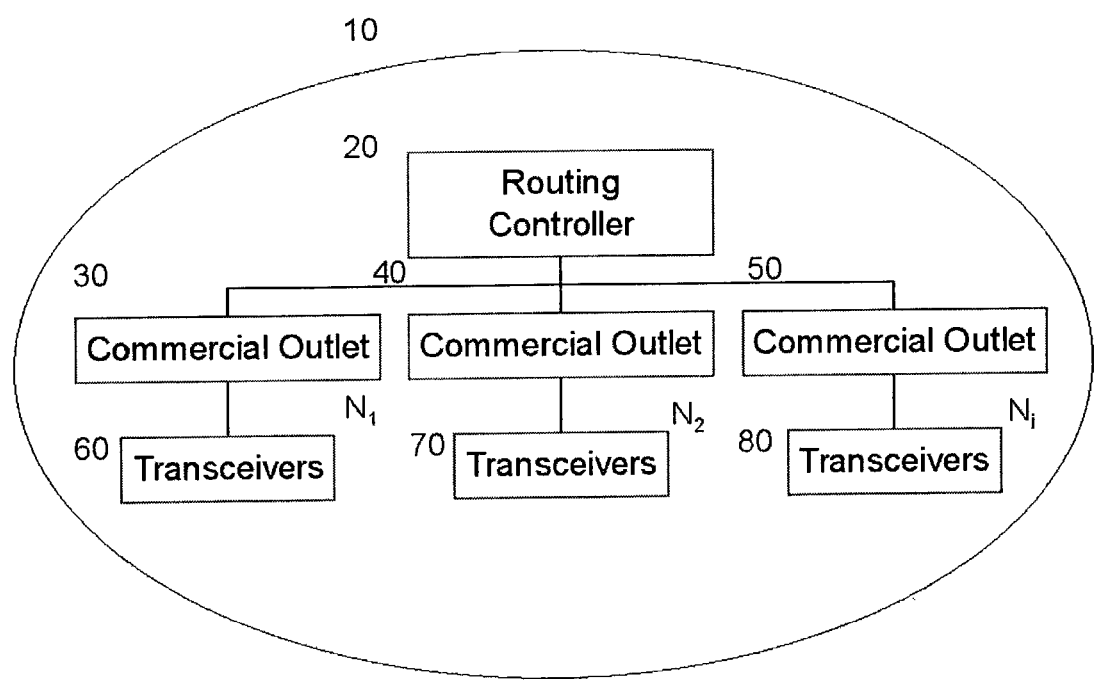
FIG. 1 illustrates the general concept of the present invention.

FIG. 1 illustrates an exemplary embodiment of the propagation of a wireless network 10 through commercial outlets. An $N_1$ commercial outlet 30 has a transceiver 60. An $N_2$ commercial outlet 40 has a transceiver 70. A $N_i$ commercial outlet 50 (where $i \geq 1$) has a transceiver 80. A routing controller 20 directs the signals from transceivers 60, 70 and 80, respectively. The routing controller 20 creates the wireless network 10 and routs the signals among the transceivers depending on the amount of bandwidth available among the transceivers.

What is claimed is:

1. A method of propagating a wireless network for transferring a signal from a source transceiver to a destination transceiver positioned remotely from the source transceiver by routing the signal through a set of intermediate transceivers without using a wireless tower comprising:

determining an optimal routing path for transferring the signal from the source transceiver through the set of intermediate transceivers to the destination transceiver, wherein the optimal routing path is based, in part, on the amount of time an intermediate transceiver in the set of intermediate transceivers will be in communication with the wireless network;

transmitting the signal from the source transceiver;

routing the signal through at least one intermediate transceiver in the set of intermediate transceivers in accordance with the optimal routing path, wherein the optimal routing path indicates the at least one intermediate transceiver and where each intermediate transceiver in the set of intermediate transceivers is operable to reproduce the signal; and receiving the signal at the at least one intermediate transceiver and transmitting the signal to the destination transceiver from the at least one intermediate transceiver;

wherein the source transceiver, the at least one intermediate transceiver, and the destination transceiver are at different locations and define the wireless network.

2. The method according to claim 1, wherein at least one of the locations is a commercial outlet.

3. The method according to claim 1, further comprising adding a an intermediate transceiver to the set of intermediate transceivers.

4. The method according to claim 3, wherein the wireless network is propagated by the addition of the intermediate transceiver to the set of intermediate transceivers.

5. The method according to claim 4, wherein the addition of the set of intermediate transceiver is in accordance with a routing scheme defined by a routing controller associated with the source transceiver.

6. The method according to claim 1, wherein routing the signal is in accordance with a routing scheme defined by a routing controller associated with the source transceiver.

* * * * *